US011743222B2

(12) United States Patent
Boyd et al.

(10) Patent No.: US 11,743,222 B2
(45) Date of Patent: Aug. 29, 2023

(54) MULTI-TIER CONNECTIONS MESSAGING FRAMEWORK

(71) Applicant: Snap Inc., Santa Monica, CA (US)

(72) Inventors: Nathan Kenneth Boyd, Los Angeles, CA (US); Benedict Copping, Los Angeles, CA (US); Benjamin Ralph Hollis, Seattle, WA (US); Susan Marie Territo, Los Angeles, CA (US); Jeremy Baker Voss, Los Angeles, CA (US); Yu Wang, Mill Valley, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/563,920

(22) Filed: Dec. 28, 2021

(65) Prior Publication Data
US 2023/0208797 A1    Jun. 29, 2023

(51) Int. Cl.
*G06F 3/04842* (2022.01)
*H04L 51/52* (2022.01)
*H04L 51/42* (2022.01)

(52) U.S. Cl.
CPC .......... *H04L 51/52* (2022.05); *G06F 3/04842* (2013.01); *H04L 51/42* (2022.05)

(58) Field of Classification Search
CPC ......... H04L 51/04; H04L 51/52; H04L 51/56; H04L 51/58; H04L 51/42; G06F 3/04842
See application file for complete search history.

(56) References Cited

U.S. PATENT DOCUMENTS

| 7,383,303 | B1 * | 6/2008 | Bort ...................... H04L 51/212 709/219 |
| 11,095,601 | B1 | 8/2021 | Wilson et al. | |
| 2006/0149816 | A1 * | 7/2006 | Cadiz .................... H04L 51/043 709/206 |
| 2014/0379813 | A1 * | 12/2014 | Charania ................ H04L 51/02 709/206 |
| 2018/0062911 | A1 * | 3/2018 | Park .................... H04L 63/0421 |

OTHER PUBLICATIONS

Gian Luca Scoccia et al., A self-configuring and adaptive privacy-aware permission system for Android apps, Aug. 1, 2020, IEEE Xplore, pp. 40-47 (Year: 2020).*
Emiliano Tramontana et al., Mitigating Privacy-related Risks for Android Users, Jun. 1, 2019, IEEE Xplore, pp. 243-248 (Year: 2019).*
"International Application Serial No. PCT/US2022/052831, International Search Report dated May 2, 2023", 4 pgs.
"International Application Serial No. PCT/US2022/052831, Written Opinion dated May 2, 2023", 4 pgs.

* cited by examiner

*Primary Examiner* — Tam T Tran
(74) *Attorney, Agent, or Firm* — Schwegman Lundberg & Woessner, P.A.

(57) ABSTRACT

A messaging system for exchanging data over a network, configuring an intermediate connection tier system that provides a multi-tier connections messaging framework. The intermediate connection tier system generates, based on the contact data of a user, an intermediate tier of connected user accounts. Each account in the intermediate tier of connected user accounts is provided with messaging privileges with respect to the account of the user, without being associated with expanded access connection tier links, sometimes referred to as friendship links, between their respective accounts with respect to the account of the user.

20 Claims, 11 Drawing Sheets

MULTI-TIER CONNECTIONS MESSAGING FRAMEWORK

TECHNICAL FIELD

The present disclosure generally relates to facilitating interactions between client devices over a network.

BACKGROUND

The popularity of computer-implemented tools that permit users to access and interact with content and other users online continues to grow. For example, various computer-implemented tools exist that permit users to interact and share content with other users through messaging applications. Some of such computer-implemented tools, termed applications or apps, can be designed to run on a mobile device such as a phone, a tablet, or a watch.

Users of the messaging system are represented by respective user profiles (also referred to as user accounts). A user's connection to other users of the messaging system may be indicated by respective connection links included in or associated with the user's account. Existing messaging applications permit users, that are each other's connections in the messaging system, to exchange text and multimedia messages.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 7:
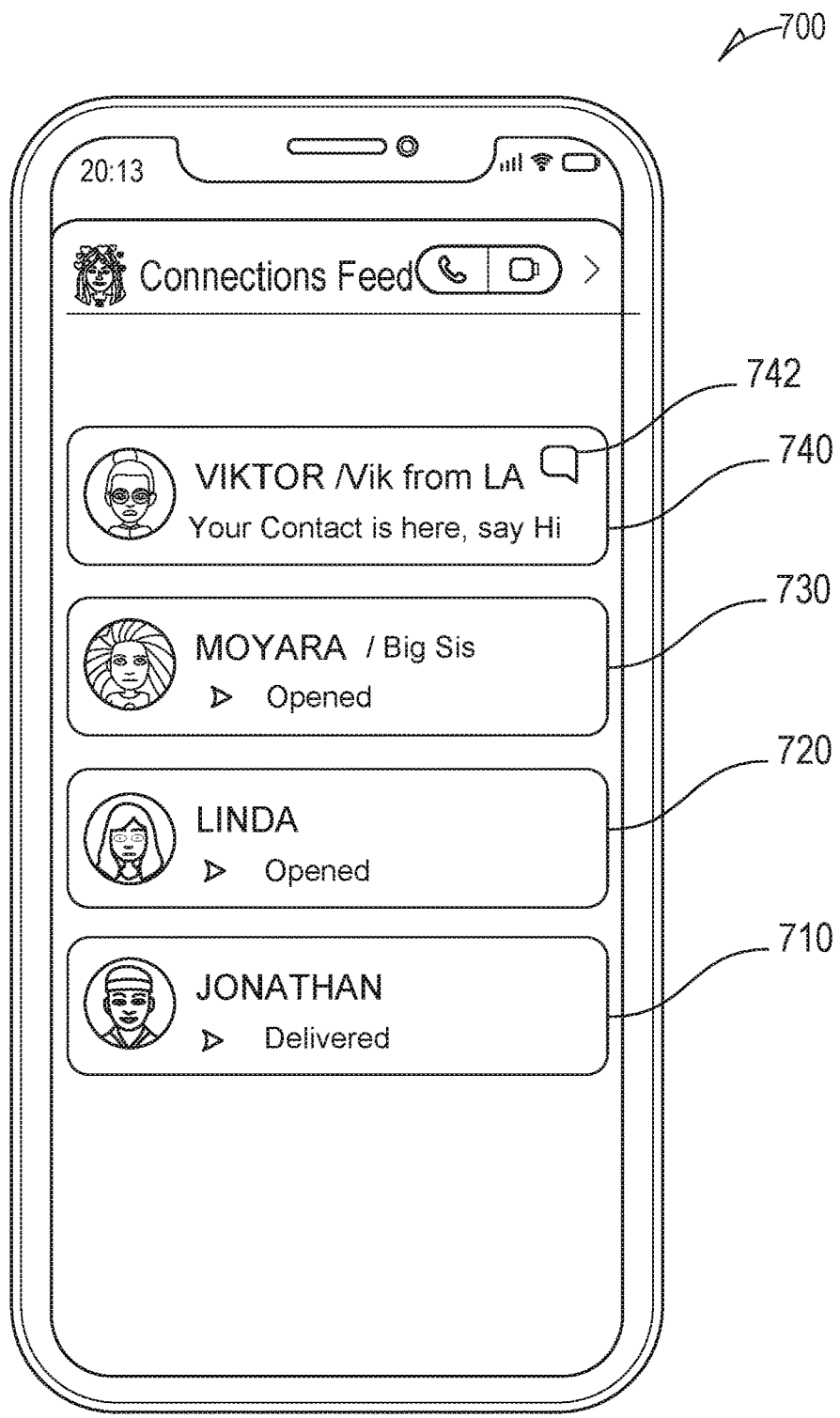
FIG. 7 is a diagram illustrating a connections feed interface (UI), in accordance with some examples.

Embodiments of the present disclosure improve the functionality of electronic messaging software and systems by enhancing users' experience with applications that provide messaging capability to registered users and that permit registered users to connect by creating connection links, referred to as friendship connection links or expanded access connection tier links, between their respective accounts. In some examples, the messaging system creates a mutual respective expanded access connection tier links for two user accounts representing two users in the messaging system, only if a connection request has been initiated by one of the users and then accepted by the other user. Users, who are represented by accounts associated with respective mutual expanded access connection tier links with respect to a given account, also referred to as expanded access connection tier accounts, often have broad access to information that is shared in the messaging system by the given user and, also, are permitted to communicate with the user represented by the given account via a messaging flow that permits exchange of text or multimedia messages in the messaging system. In some examples, notifications related to expanded access connection tier accounts with respect to a given user account are displayed in a connections feed user interface (UI), sometimes referred to as a friends feed UI. An example of a connections feed UI 700 is illustrated in FIG. 7, which is described further below.

The technical problem of permitting users of the messaging system, that lack the expanded access connection tier links between their respective accounts, but may be associated with metadata that indicates mutual disposition for interacting with each other (such as, for example, each other's phone numbers and/or email addresses in their respective contact books), to communicate via the messaging flow, is addressed by providing an intermediate connection tier system.

The intermediate connection system is configured generate, based on the contact book (also referred to as contact data, for the purposes of this description) of a user, an intermediate tier of connected user accounts (intermediate connection tier accounts), in which each account has messaging privileges with respect to the account of the user without being associated with an expanded access connection tier link with respect to the account of the user. The intermediate connection tier accounts may also be referred to as contact book accounts. The intermediate connection tier relationship can be one-directional or bi-directional, in that a first account may be designated as an intermediate connection tier account with respect to a second account, while the second account may be or may be not designated as an intermediate connection tier account with respect to the first account.

It will be noted that, while the multi-tier connections messaging network is described utilizing phone numbers in a user's contact data, the methodology described herein using other communication destination data, such as, for example email addresses.

Figure 8:
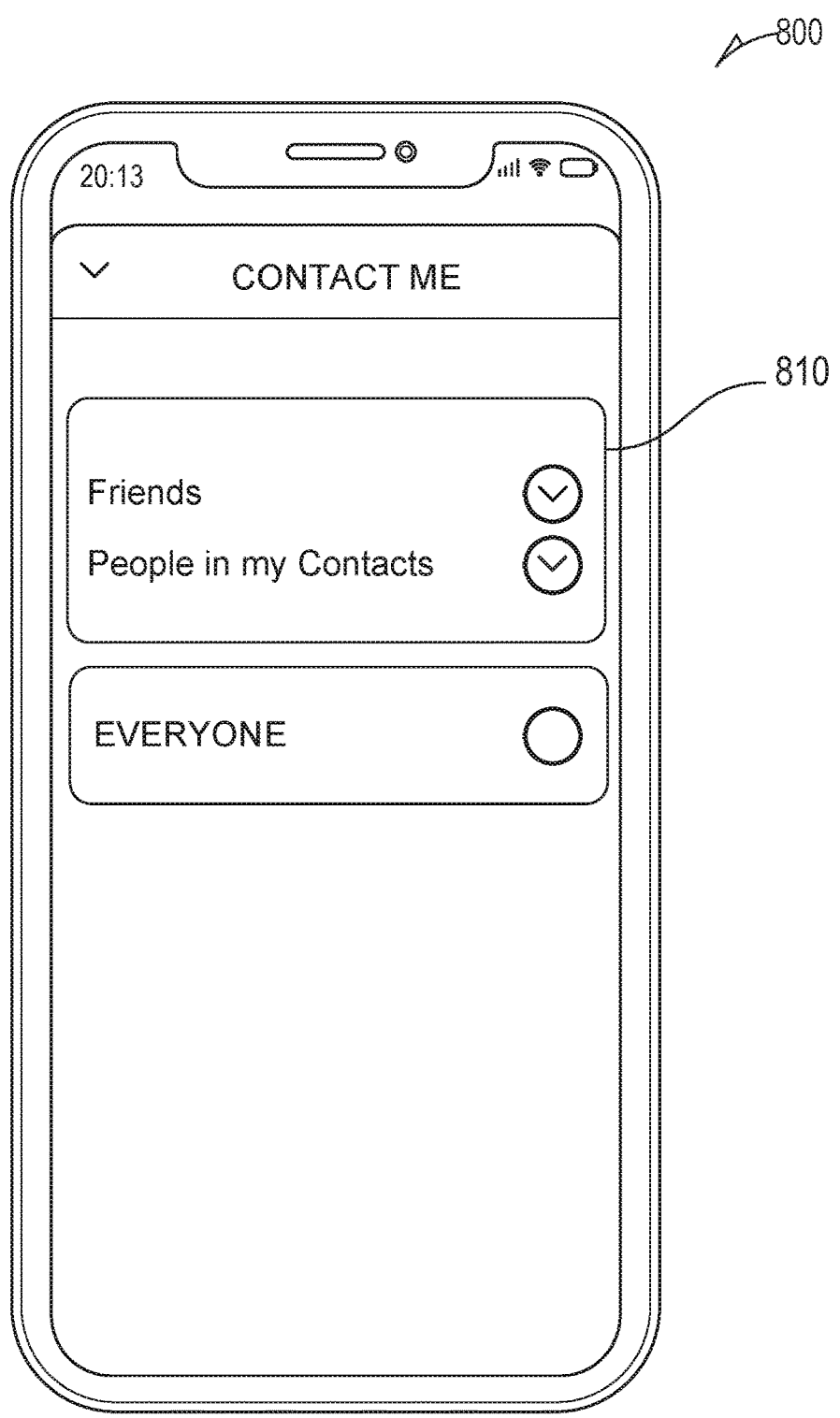
FIG. 8 is a diagram illustrating a privacy settings UI, in accordance with some examples.

The intermediate connection tier system, in some examples, presents to a user a privacy settings UI that displays a selectable option to designate people in the user's contact data as having the permission to contact the user via the messaging flow, through the connections feed UI. An example privacy settings UI 800 is illustrated in FIG. 8, which is described further below. An example of a messaging system, within which the intermediate connection tier system can be implemented, is described further below with reference to FIGS. 1-5.

NETWORKED COMPUTING ENVIRONMENT

Figure 1:
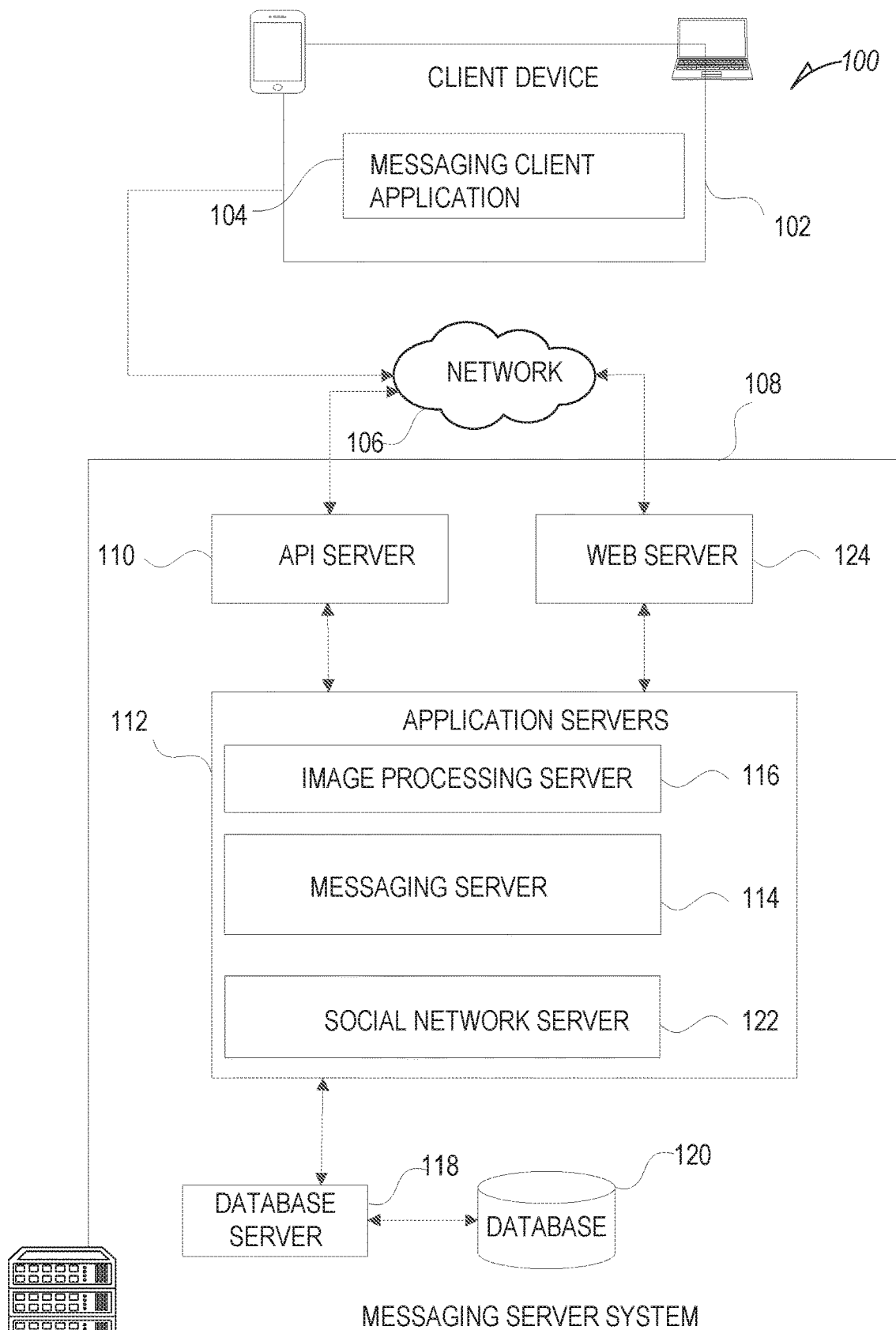
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network, within which a voice chat system can be implemented. The messaging system 100 includes multiple instances of a client device 102, each of which hosts a number of applications, including a messaging client application 104. Each messaging client application 104 is communicatively coupled to other instances of the messaging client application 104 and a messaging server system 108 via a network 106 (e.g., the Internet). The messaging client application 104 is implemented by one or more processors of the client device 102 and is supported by the backend system, which is the messaging server system 108.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 may be a design choice. For example, it may be technically preferable to initially deploy certain technology and functionality within the messaging server system 108 but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. For example, the database 120 stores audio content from voice chat messages associated with the respective sender identifications, with or without the associated text. For the purposes of this description, a voice chat message includes an audio message (or a reference to the audio message) and the associated text representation of the audio. The audio content from a voice chat message may persist until an instruction to delete the voice chat message is received at the messaging system 108.

Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client application 104 in order to invoke functionality of the application servers 112. The Application Program Interface (API) server 110 exposes various functions supported by the application servers 112, including account registration, login functionality, the sending of messages, via the application servers 112, from a particular messaging client application 104 to another messaging client application 104, the sending of media files (e.g., images or video) from a messaging client application 104 to a messaging server 114, and for possible access by another messaging client application 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client application 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client application 104. In some examples, the messaging server facilitates a privacy setting that enables a user to designate people who are listed in their contact data and who also are users of the messaging system 108, as their intermediate connection connection tiers that are permitted to communicate with the user via a messaging flow designed for communication between accounts that are identified as mutual expanded access connections. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
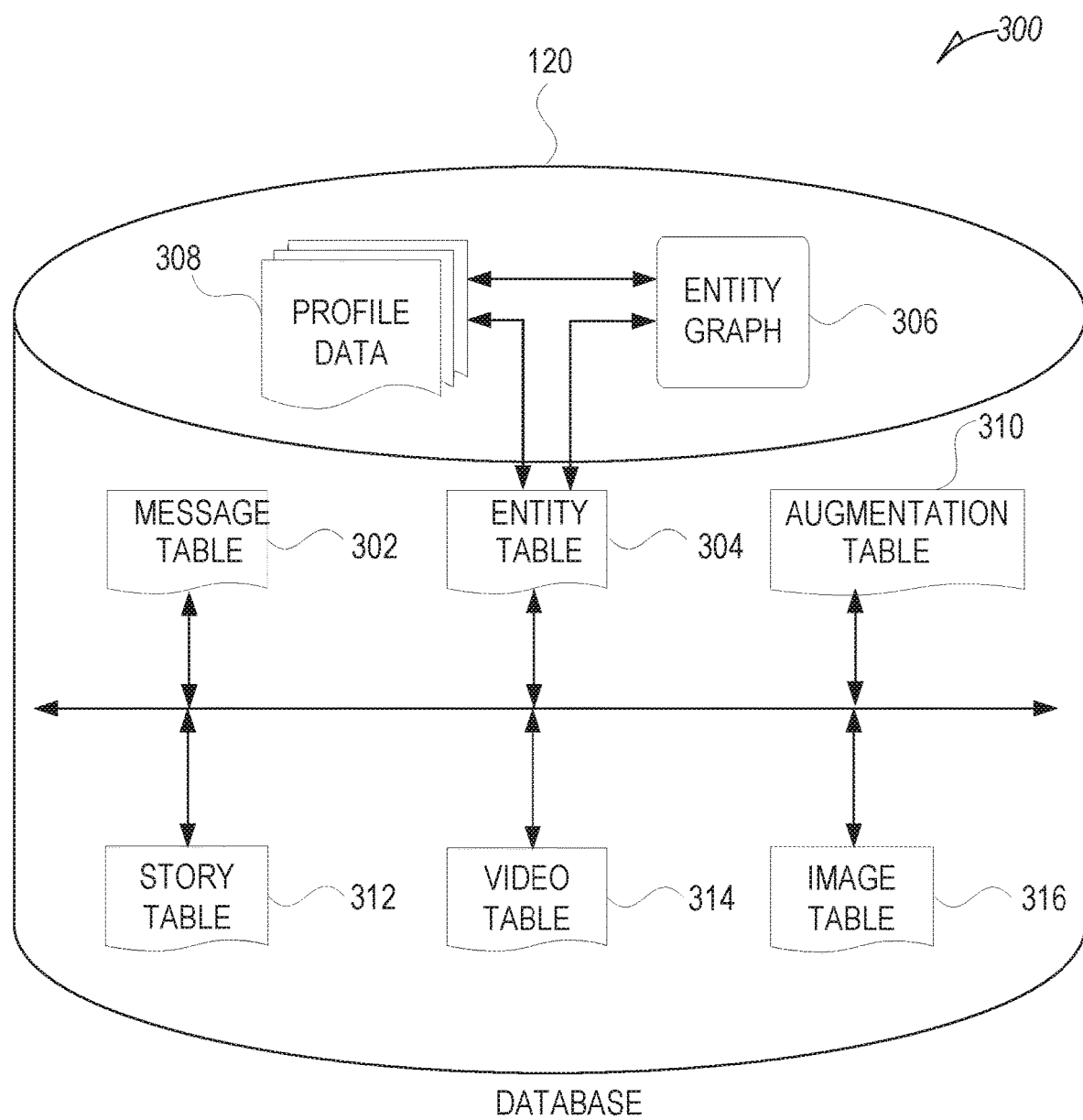
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

SYSTEM ARCHITECTURE

Figure 2:
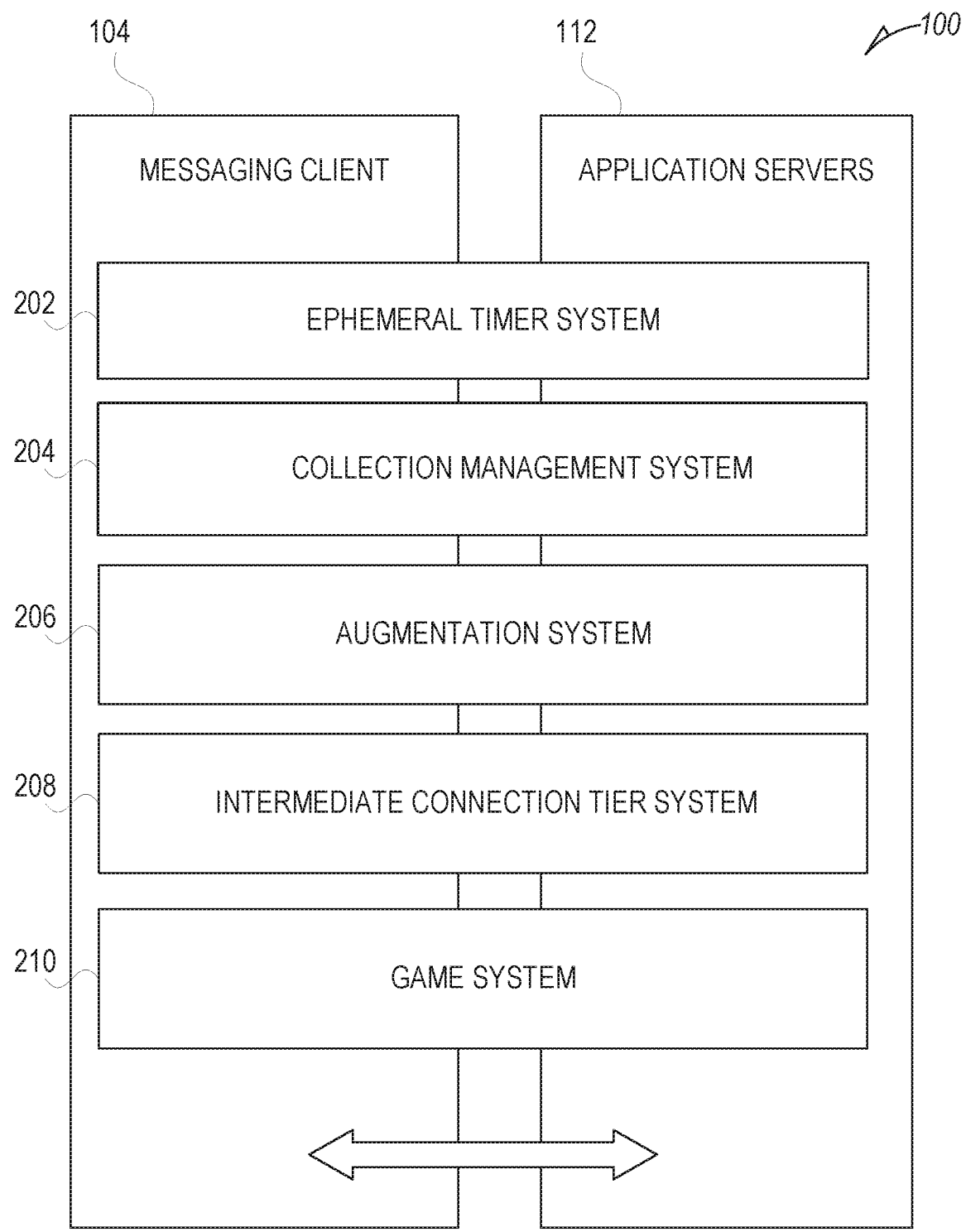
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client application 104 and the application servers 112. The messaging system 100 embodies a number of subsystems, which are supported on the client-side by the messaging client application 104 and on the sever-side by the application servers 112. These subsystems include, for example, an ephemeral timer system 202, a collection management system 204, an augmentation system 206, and a game system 210. The ephemeral timer system 202 is responsible for enforcing the temporary or time-limited access to content by the messaging client application 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client application 104. Further details regarding the operation of the ephemeral timer system 202 are provided below. The collection management system 204 is responsible for managing sets or collections of media (e.g., collections of text, image video, and audio data). Such a collection may be made available for a specified time period, such as the duration of an event to which the content relates. For example, content relating to a music concert may be made available as a "story" for the duration of that music concert. The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client application 104 based on a geolocation of the client device 102. In another example, the augmentation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The media overlays may be stored in the database 120 and accessed through the database server 118. The game system 210 provides various gaming functions within the context of the messaging client application 104. The messaging client application 104 provides a game interface providing a list of available games that can be launched by a user within the context of the messaging client application 104, and played with other users of the messaging system 100. The messaging system 100 further enables a particular user to invite other users to participate in the play of a specific game, by issuing invitations to such other users from the messaging client application 104. The messaging client application 104 also supports both the voice and text messaging (e.g., chats) within the context of gameplay, provides a leaderboard for the games, and also supports the provision of in-game rewards.

Also shown in FIG. 2 is an intermediate connection tier system 208. The intermediate connection tier system 208, which can be included in or supported by the messaging server 114 and/or the social network server 122 of FIG. 2. The intermediate connection tier system 208 is configured generate, based on the contact data of a user that may be stored at the client device 102, an intermediate tier of connected user accounts. Each account in the intermediate tier of connected user accounts is provided with messaging privileges with respect to the account of the user without being associated with a bidirectional expanded access connection tier link with respect to the account of the user.

DATA ARCHITECTURE

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The message sender data and the message recipient (or receiver) may indicate that the user account representing the sender has been identified as represented by an intermediate connection tier account with respect to the user account of the recipient. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging client applications 104 to other users. The collection of avatar representations may include "status avatars," which present a graphical representation of a status or activity that the user may select to communicate at a particular time.

The database 120 also stores augmentation data, such as overlays or filters, in an augmentation table 310, The augmentation data is associated with and applied to videos (for which data is stored in a video table 314) and images (for which data is stored in an image table 316). Other augmentation data that may be stored within the image table 316 includes augmented reality content items (e.g., corresponding to applying Lenses or augmented reality experiences). An augmented reality content item may be a real-time special effect and sound that may be added to an image or a video.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client application 104 may include an icon that is user-selectable to enable a sending user to add specific content to his or her personal story.

DATA COMMUNICATIONS ARCHITECTURE

Figure 4:
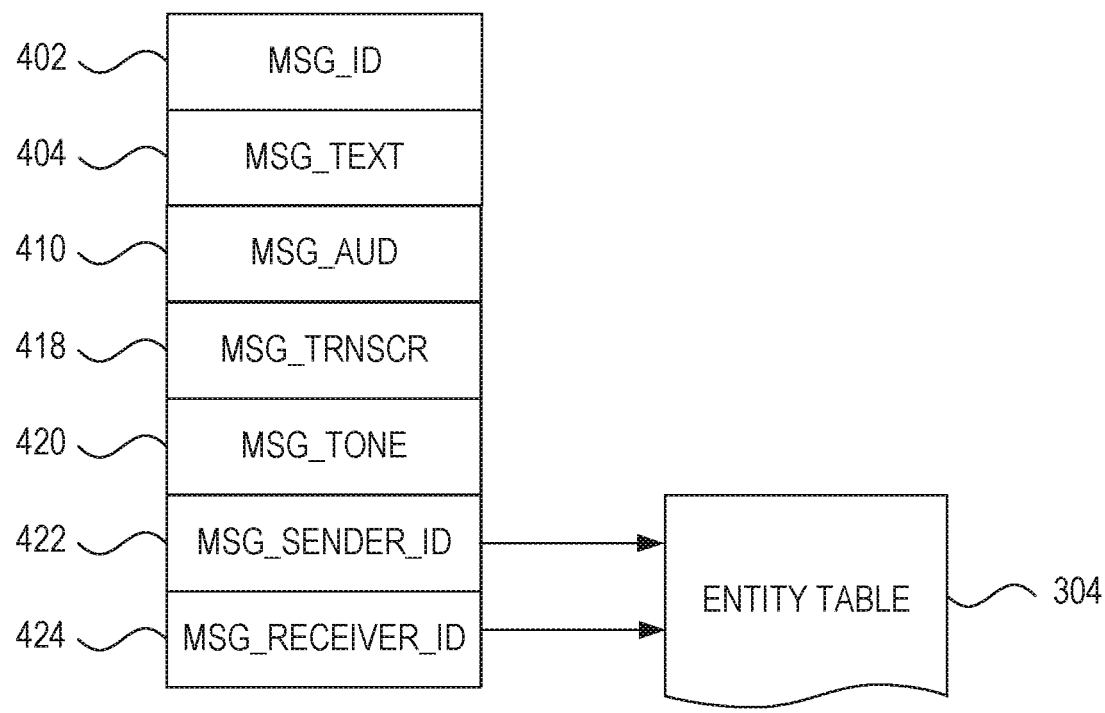
FIG. 4 is a diagrammatic representation of a message, in accordance with some examples.

FIG. 4 is a schematic diagram illustrating a structure of a message 400, according to some examples, generated by a messaging client application 104 for communication to a further messaging client application 104 or the messaging server 114. A message 400 can be from a sender user account that had been identified as an intermediate connection tier account with respect to the recipient account. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message audio payload 410: audio data, captured by a microphone or retrieved from a memory component of the client device 102 message audio transcription payload 418: audio transcription data, generated from audio captured by a microphone or retrieved from a memory component of the client device 102, and that is included in the message 400.
- message audio tone payload 420: audio tone data, inferred from audio captured by a microphone or retrieved from a memory component of the client device 102, and that is included in the message 400.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, values stored within the message sender identifier 422 and the message receiver identifier 424 may point to user records stored within an entity table 304.

TIME-BASED ACCESS LIMITATION ARCHITECTURE

Figure 5:
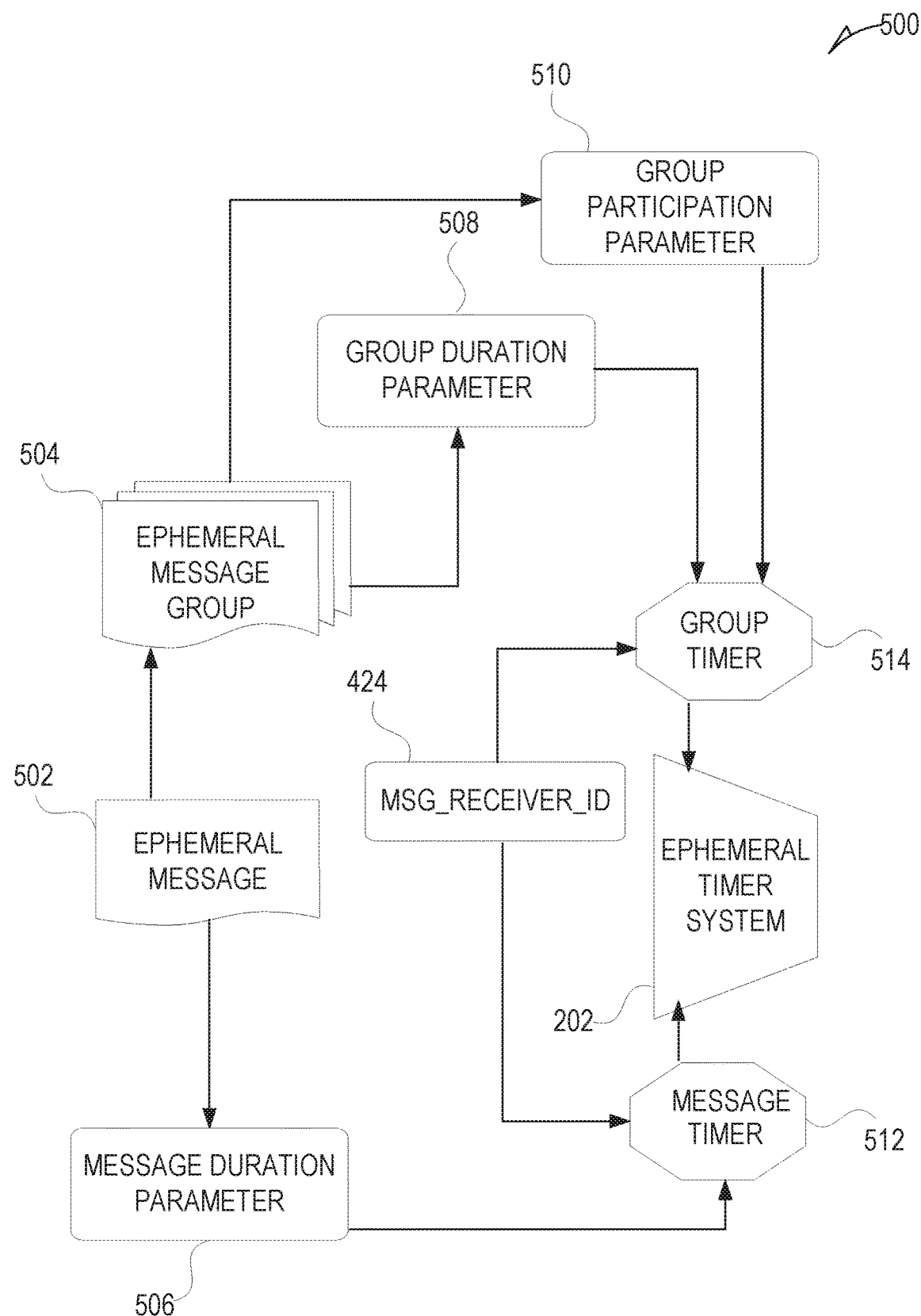
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is associated with an identification of a sending user (MSG_SENDER_ID 422 of FIG. 4) and is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506. In some examples, an ephemeral message 502 is from a sender user account that had been identified as an intermediate connection tier account with respect to the recipient account.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral tinier system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502. It will be noted that access to content may or may not be made ephemeral in the messaging system 100 of FIG.

1. Example operations performed by the intermediate connection tier system 208 of FIG. 2 are described below, with reference to FIG. 6.

PROCESS FLOW AND USER INTERFACES

Figure 6:
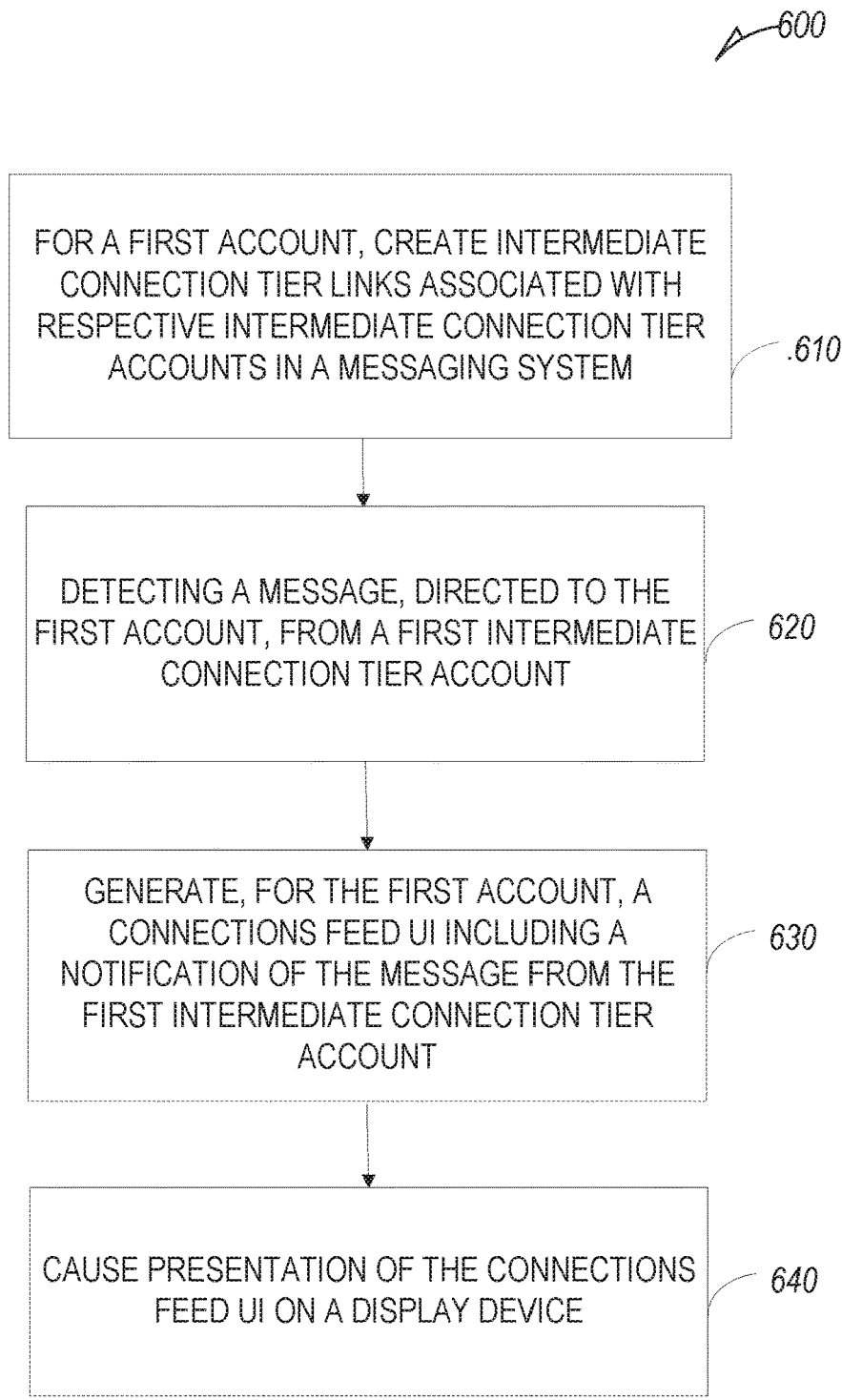
FIG. 6 is a flowchart of a method for facilitating multi-tier connections messaging, in accordance with some examples.

FIG. 6 is a flowchart of a method 600 for facilitating multi-tier connections messaging. Some or all processing logic resides, for example, at the client device 102 of FIG. 1 and/or at the messaging server system 108 of FIG. 1. As explained above, the messaging system maintains user accounts representing respective users. Each account in the messaging system is associated with a unique communication destination identifier, such as, e.g., a phone number, and a display name. When a new account is created, the associated user may be required to verify their communication destination identifier. A phone number, for example, may be verified by responding to a text message automatically generated and communicated by the messaging system. The display name for an account is selected by a user and is often the user's first and last name.

An account of a user can be associated with or include expanded access connection tier links. An expanded access connection tier link from a user account indicates another account, which is referred to as an expanded access connection tier account, for the purposes of this description. An expanded access connection tier link associated with a given account can be established only subsequent to an explicit request or consent to establish such connection, received in the messaging system from a user represented by the given account.

A user's client device, e.g., the client device 102 of FIG. 1, stores contact data of the user in a contact data. The contact data of a user comprise communication destination identifiers associated with respective contact names. A user may upload their contact data to the messaging system or give the messaging system permission to obtain or access their contact data. The messaging system may be configured to use the contact data information, also referred to as merely contact data, to determine other accounts in the messaging system that are associated with any of the communication destination identifiers from the user's contact data and identify those accounts as contact data accounts, also referred to as an intermediate connection tier accounts, with respect to the user account. Each account in the intermediate connection tier accounts is provided with messaging privileges with respect to the account of the user, without being associated with a bidirectional expanded access connection tier link with respect to the account of the user.

The method 600 commences at operation 610 when the intermediate connection tier system 208 of FIG. 2 creates, for an account of a user of the messaging system, referred to as a first user account, intermediate connection tier links representing intermediate connection connection tiers of the user. The accounts from the intermediate connection tier accounts are only those that are identified in the messaging system by a communication destination identifier that is present in the contact data. The messaging system may generate, for the first user account, a privacy settings UI. that includes a user selectable element actionable to permit the creating of the intermediate connection tier links. The intermediate connection tier system 208 creates the intermediate connection tier links in response to detecting activation of said user selectable element. An example privacy settings UI 800 is illustrated in FIG. 8, which is described further below. The privacy settings UI can be generated and presented to a user at the time when the user is first setting their account in the messaging system, in the process of a new user flow provided by the messaging system, e.g., in response to an operation initiated by the user indicating a request to access the privacy setting UI.

Figure 9:
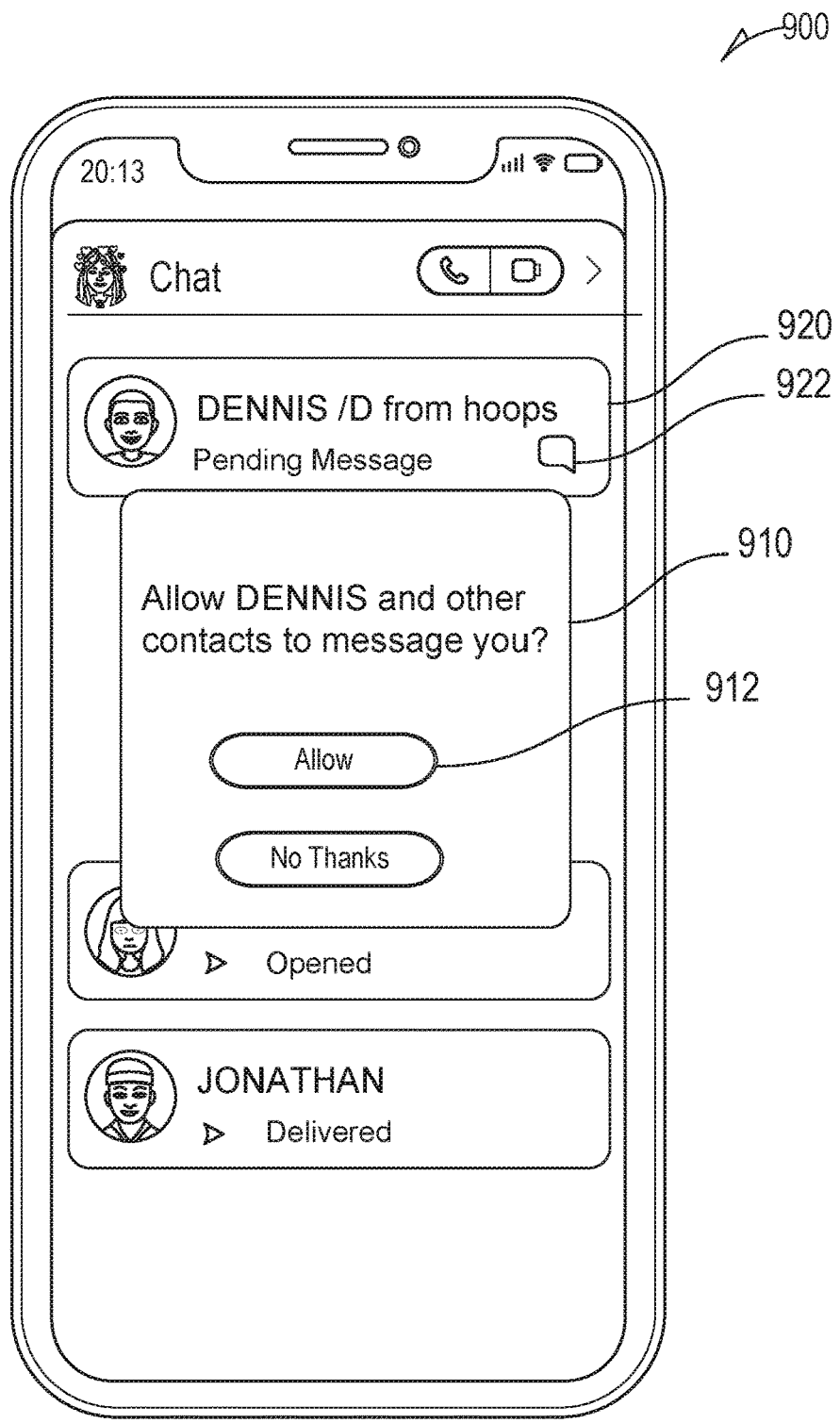
FIG. 9 is a diagram illustrating a connections feed UI with a call-to-action overlay, in accordance with some examples.

In some examples, where the privacy setting indicating the permission or request to create the intermediate connection tier links for the user have not been activated, the messaging system generates a call-to-action overlay, overlayed over the connections feed UI, in response to detecting an indication of a message from an account that is not a expanded access connection tier account with respect to the first user account, but which is represented by a communication destination identifier that is present in the user's contact data. For example, the messaging system may generate, for the first user account, a connections feed UI that displays, in addition to notifications related to expanded access connection tier accounts with respect to the first user account, a notification of a pending message from a non-expanded access connection tier account represented by a communication destination identifier that appears in the user's contact data. In response to detecting a user action with respect to a feed cell that displays the notification of a pending message, the intermediate connection tier system 208 generates a call-to-action overlay that includes a user selectable element actionable to permit creating of the intermediate connection tier links for the user based on their contact data information. An example call-to-action overlay is shown in FIG. 9, which is described further below.

At operation 620, the intermediate connection tier system 208 detects a message from a intermediate connection tier account, directed to the first account. In response to the detecting, at operation 630, the intermediate connection tier system 208 generates, for the first account, a connections feed UI. The connections feed UI includes a first feed cell that displays a notification of the message. The notification of the message included in the first feed cell of the connections feed UI includes a display name from the intermediate connection tier account and, also, a subtext indicating a contact name from the contact data. The intermediate connection tier system 208 causes presentation of the connections feed UI on a display device of the user at operation 640.

Figure 10:
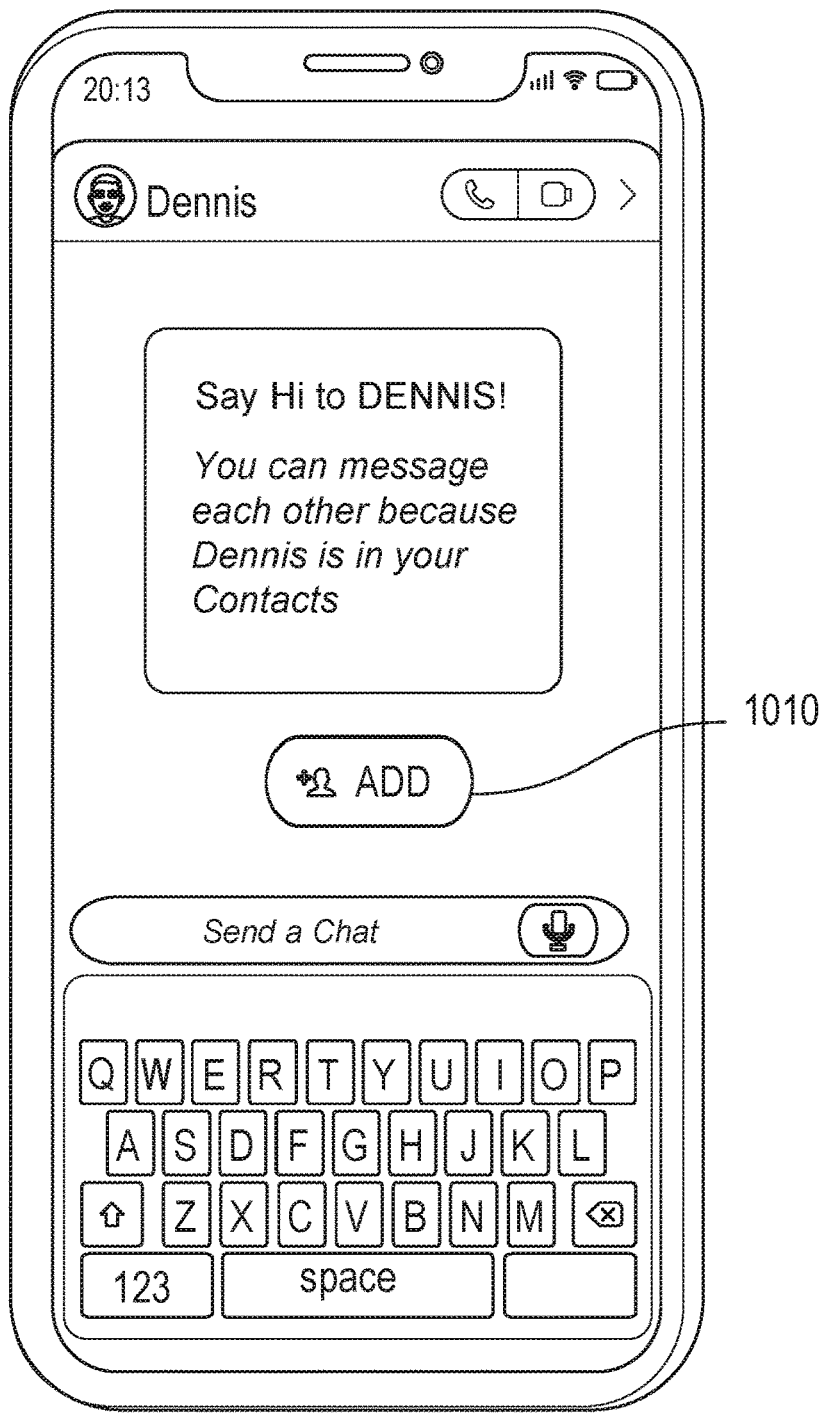
FIG. 10 is a diagram illustrating a chat UI, in accordance with some examples.

The connections feed UI, in addition to displaying the notification of the message from a intermediate connection tier account, may include one or more other feed cells that include notifications related to messages from fiend connections of the user, as well as a feed cell displaying a conversation invitation. A conversation invitation may include text such as, e.g., "your contact is here," indicating that the user's contact has an account with the messaging system, a reference to an associated intermediate connection tier account, and a user selectable element actionable to launch a chat UI. The chat UI, which is generated for the user with respect to a certain intermediate connection tier account, is launched in response to detecting activation of the user selectable element. In some examples, the Chat UI includes a user selectable element actionable to request establishing a expanded access connection tier link with the intermediate connection tier account. An example chat UI 1000 is shown in FIG. 10, which is described further below.

In response to the detecting, at operation 630, the intermediate connection tier system 208 generates for the first account, a connections feed UI. The connections feed UI including a first feed cell that displays a notification of the message. The notification of the message included in the first feed cell of the connections feed UI includes a display name from the intermediate connection tier account and, also, a subtext indicating a contact name from the contact data. The connections feed UI may include one or more further cells displaying respective notifications from one or more accounts from the expanded access connection tier accounts associated with the first user account. The connections feed UI includes a second feed cell displaying a conversation invitation ("your contact is on snap") including a reference to a intermediate connection tier account and a second user selectable element actionable to launch a chat UI. The intermediate connection tier system 208 causes presentation of the connections feed UI on a display device of the user at operation 640.

The connections feed UI, in addition to displaying the notification of the message from a intermediate connection tier account, may include one or more other feed cells that include notifications related to messages from fiend connections of the user, as well as a feed cell displaying a conversation invitation. A conversation invitation may include the text such as, e.g., "your contact is on snap," a reference to a intermediate connection tier account, and a user selectable element actionable to launch a chat UI. The chat UI generated for the user with respect to a certain intermediate connection tier account is launched in response to detecting activation of the user selectable element and, in some examples, includes a user selectable element actionable to request establishing a expanded access connection tier link with the intermediate connection tier account. An example chat UI 1000 is shown in FIG. 10, which is described further below.

FIG. 7 is a diagram illustrating a connections feed UI 700. The connections feed UI 900 includes notifications related to expanded access connection tier accounts with respect to the first user account, shown in feed cells identified by reference numerals 710 and 720, and, also, notifications related to intermediate connection tier accounts with respect to the first user account, shown in feed cells identified by reference numerals 730 and 740.

The feed cell 740 display a conversation invitation with respect to a user that has their display name "VIKTOR" in the messaging system and who is identified as "Vik from LA" in the user's contact data. As can be seen in the feed cell 740, both the display name "VIKTOR" and the contact data name "Vik from LA" are presented to the user. The feed cell 740 is shown as including a user selectable element 742, actionable to launch a chat UI. In some examples, chat UT may be launched in response to some other detected interaction with the feed cell 740.

FIG. 8 is a diagram illustrating a privacy settings UI 800 that includes a user selectable element 810 actionable to permit the creating of the intermediate connection tier links based on the user's contact data. As explained above, the privacy settings UI 800 can be generated and presented to a user at the time when the user is first setting their account in the messaging system.

FIG. 9 is a diagram illustrating a connections feed UI 900 with a call-to-action overlay 910. A notification of a pending message associated with non-expanded access connection tier account represented by a communication destination identifier that appears in the user's contact data is shown in a feed cell 920. In response to detecting a user action with respect to the feed cell 920, for example with a user selectable element 922, the intermediate connection tier system 208 of FIG. 2 generates the call-to-action overlay 910 that includes a user selectable element 912 actionable to permit creating of the intermediate connection tier links for the user based on their contact data information and, also, launches a chat UI that permits the user to interact with a user represented by the non-expanded access connection tier account.

FIG. 10 is a diagram illustrating a chat UI 1000. The Chat UI 1000 includes a user selectable element 1010 actionable to request establishing a expanded access connection tier link with the intermediate connection tier account.

MACHINE ARCHITECTURE

Figure 11:
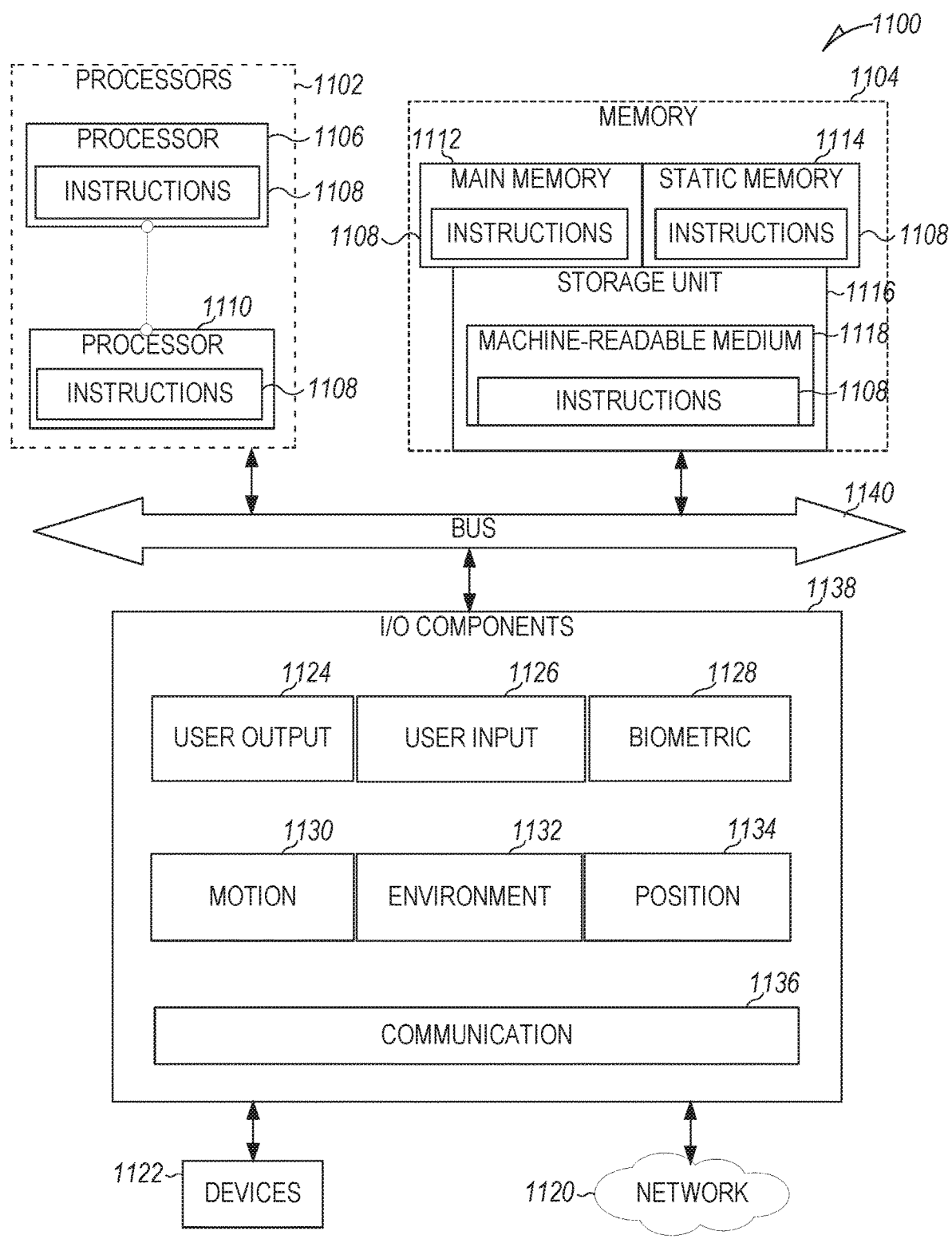
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 600 within which instructions 608 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output I/O components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (˜MC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1112, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface Component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2 D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 1122.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3 GPP) including 3 G, fourth generation wireless (4 G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    in a messaging system to exchange data over a network, maintaining a set of user accounts including a first account associated with contact data comprising communication destination identifiers associated with respective contact names;
    for the first account, creating intermediate connection tier links associated with respective intermediate connection tier accounts from the set of user accounts, each account from the intermediate connection tier accounts identified in the messaging system by a communication destination identifier that is present in the contact data;
    in response to detecting a message, directed to the first account, from a first intermediate connection tier account from the intermediate connection tier accounts, generating, for the first account, a connections feed user interface (UI) including a first feed cell displaying a notification of the message from the first intermediate connection tier account; and
    causing presentation of the connections feed UI on a display device.

2. The method of claim 1, wherein the first account represents a first user in a messaging system for exchanging data over a network, the creating of the intermediate connection tier links comprises obtaining permission from the first user to access the contact data.

3. The method of claim 2, wherein the creating of the intermediate connection tier links comprises:
    generating, for the first account, a privacy settings UI including a first user selectable element actionable to permit the creating of the intermediate connection tier links; and
    detecting activation of the first user selectable element.

4. The method of claim 3, wherein the generating of the privacy setting UI is included in a new user flow provided by the messaging system.

5. The method of claim 1, wherein the notification of the message from the first intermediate connection tier account comprises a display name from the intermediate connection tier account and a subtext indicating a contact name from the contact data.

6. The method of claim 1, wherein the connections feed UI includes a second feed cell displaying a conversation invitation, a reference to contact data account and a second user selectable element actionable to launch a chat UI.

7. The method of claim 6, comprising: launching the chat UI in response to detecting activation of the second user selectable element.

8. The method of claim 7, comprising: including in the chat UI a third user selectable element actionable to request establishing a expanded access connection tier link with the intermediate connection tier account.

9. The method of claim 1, wherein:
    the first account is associated with expanded access connection tier links associated with respective expanded access connection tier accounts from the set of user accounts, each expanded access connection tier link from the expanded access connection tier links established in response to an explicit request or consent received in the messaging system from a user represented by the expanded access connection tier account; and
    the connections feed UI includes one or more further cells displaying respective notifications from one or more accounts from the expanded access connection tier accounts.

10. The method of claim 1, wherein the contact data is stored on a client device.

11. A system comprising:
    one or more processors; and
    a non-transitory computer readable storage medium comprising instructions that when executed by the one or processors cause the one or more processors to perform operations comprising:
    in a messaging system to exchange data over a network, maintaining a set of user accounts including a first account associated with contact data comprising communication destination identifiers associated with respective contact names;
    for the first account, creating intermediate connection tier links associated with respective intermediate connection tier accounts from the set of user accounts, each account from the intermediate connection tier accounts identified in the messaging system by a communication destination identifier that is present in the contact data;
    in response to detecting a message, directed to the first account, from a first intermediate connection tier account from the intermediate connection tier accounts, generating, for the first account, a connections feed UI including a first feed cell displaying a notification of the message from the first intermediate connection tier account; and
    causing presentation of the connections feed UI on a display device.

12. The system of claim 11, wherein the first account represents a first user in a messaging system for exchanging data over a network, the creating of the intermediate connection tier links comprises obtaining permission from the first user to access the contact data.

13. The system of claim 12, wherein the creating of the intermediate connection tier links comprises:
    generating, for the first account, a privacy settings UI including a first user selectable element actionable to permit the creating of the intermediate connection tier links; and
    detecting activation of the first user selectable element.

14. The system of claim 13, wherein the generating of the privacy setting UI is included in a new user flow provided by the messaging system.

15. The system of claim 11, wherein the notification of the message from the first intermediate connection tier account comprises a display name from the intermediate connection tier account and a subtext indicating a contact name from the contact data.

16. The system of claim 11, wherein the connections feed UI includes a second feed cell displaying a conversation invitation, a reference to contact data account and a second user selectable element actionable to launch a chat UI.

17. The system of claim 16, wherein the operations caused by instructions executed by the one or processors further include: launching the chat UI in response to detecting activation of the second user selectable element.

18. The system of claim 17, wherein the operations caused by instructions executed by the one or processors further include: including in the chat UI a third user selectable element actionable to request establishing a expanded access connection tier link with the intermediate connection tier account.

19. The system of claim 11, wherein the operations caused by instructions executed by the one or processors further include:
the first account is associated with expanded access connection tier links associated with respective expanded access connection tier accounts from the set of user accounts, each expanded access connection tier link from the expanded access connection tier links established in response to an explicit request or consent received in the messaging system from a user represented by the expanded access connection tier account; and
the connections feed UI includes one or more further cells displaying respective notifications from one or more accounts from the expanded access connection tier accounts.

20. A machine-readable non-transitory storage medium having instruction data executable by a machine to cause the machine to perform operations comprising:
in a messaging system for exchanging data over a network, maintaining a set of user accounts including a first account associated with contact data comprising communication destination identifiers associated with respective contact names;
for the first account, creating intermediate connection tier links associated with respective intermediate connection tier accounts from the set of user accounts, each account from the intermediate connection tier accounts identified in the messaging system by a communication destination identifier that is present in the contact data;
in response to detecting a message, directed to the first account, from a first intermediate connection tier account from the intermediate connection tier accounts, generating, for the first account, a connections feed UI including a first feed cell displaying a notification of the message from the first intermediate connection tier account; and
causing presentation of the connections feed UI on a display device.

* * * * *